(12) United States Patent
Huang

(10) Patent No.: US 7,568,721 B2
(45) Date of Patent: Aug. 4, 2009

(54) FOLDABLE THREE-WHEEL STROLLER

(76) Inventor: Ming-Tai Huang, 4<sup>th</sup> Fl, No. 302, Chengteh Rd., Sec. 7, Taipei (TW)

( * ) Notice: Subject to any disclaimer, the term of this patent is extended or adjusted under 35 U.S.C. 154(b) by 153 days.

(21) Appl. No.: 11/773,624

(22) Filed: Jul. 5, 2007

(65) Prior Publication Data

US 2009/0008907 A1  Jan. 8, 2009

(51) Int. Cl.
B62B 1/00 (2006.01)

(52) U.S. Cl. .................. 280/642; 280/639; 280/47.38

(58) Field of Classification Search ............... 280/644, 280/650, 643, 642, 639, 658, 47.17, 47.25, 280/47.38, 647; 297/44, 45
See application file for complete search history.

(56) References Cited

U.S. PATENT DOCUMENTS

| | | | | |
|---|---|---|---|---|
| 5,669,624 A * | 9/1997 | Eichhorn | ................... | 280/642 |
| 5,695,212 A * | 12/1997 | Hinkston | ................... | 280/642 |
| 5,863,061 A * | 1/1999 | Ziegler et al. | ............... | 280/642 |
| 6,053,525 A * | 4/2000 | Lin | ............................ | 280/642 |
| 6,102,431 A * | 8/2000 | Sutherland et al. | .......... | 280/642 |
| 6,325,406 B1 * | 12/2001 | O'Shea et al. | ............. | 280/642 |
| 6,533,310 B2 * | 3/2003 | O'Shea et al. | ............. | 280/644 |
| 6,722,690 B2 * | 4/2004 | Lan | ............................ | 280/642 |
| 6,739,616 B2 * | 5/2004 | Lin | ............................ | 280/642 |
| 6,767,028 B2 * | 7/2004 | Britton et al. | ............... | 280/644 |
| 6,863,297 B2 * | 3/2005 | Shapiro | ...................... | 280/646 |
| 7,021,651 B2 * | 4/2006 | Lan | ............................ | 280/642 |
| 7,077,420 B1 * | 7/2006 | Santoski | ..................... | 280/642 |
| 7,398,988 B2 * | 7/2008 | Ostrow et al. | ............... | 280/642 |
| 7,451,999 B1 * | 11/2008 | Liu | ............................ | 280/642 |

FOREIGN PATENT DOCUMENTS

| | | |
|---|---|---|
| DE | 20 2004 020186 | 3/2005 |
| EP | 1260422 | 11/2002 |
| EP | 1466810 | 10/2004 |
| EP | 1671869 | 6/2006 |
| GB | 2360980 | 10/2001 |

* cited by examiner

*Primary Examiner*—Hau V Phan
(74) *Attorney, Agent, or Firm*—Alan Kamrath; Kamrath & Associates PA

(57) ABSTRACT

A three-wheel foldable stroller includes two handles, two rear legs, two front legs, and a front linking device. A lower end of each handle and an upper end of one of the front legs are releasably locked by a locking member. Each rear leg includes an upper end pivotably connected to the lower end of one of the handles and includes a lower end to which a rear wheel is attached. The front linking device includes a front-wheel base to which a front wheel is attached and includes two tubes respectively on two sides of the front-wheel base. Each tube includes an upper end connected to the lower end of one of the front legs and includes a lower end pivotably connected to the front-wheel base. The front legs and the tubes are pivotable inward or outward relative to the front-wheel base when the locking members are unlocked.

8 Claims, 9 Drawing Sheets

FOLDABLE THREE-WHEEL STROLLER

BACKGROUND OF THE INVENTION

The present invention relates to a foldable three-wheel stroller and, more particularly, to a foldable three-wheel toy stroller.

Strollers for carrying babies or toy strollers for carrying dolls generally include two handles, a frame, and wheels. To allow easy carriage or storage when not in use, the frame generally includes joints that are pivotable to allow folding and that can be locked when folded or extended. However, the frame may be inadvertently folded due to pivotal movements of the joints resulting from impact or other causes, causing injury to a baby or child in a stroller or pushing a toy stroller. Namely, the structure of the joints of the frame is important not only to convenient operation of folding/unfolding of the stroller but also to safety. Foldable strollers generally have a frame for four wheels, and the frame is foldable in a front/rear direction in which the front and rear wheels are adjacent to each other after folding. However, it is difficult to minimize the folded volumes of the four-wheeled strollers foldable in the front/rear direction, which is inconvenient for storage and transport. Application of the folding frames of conventional four-wheel strollers on three-wheel toy strollers is also difficult.

It is, therefore, a need for a foldable frame for a three-wheel stroller that can be folded to a minimized volume for easy storage and transport.

BRIEF SUMMARY OF THE INVENTION

The present invention solves this need and other problems in the field of foldable frames for three-wheel toy strollers by providing, in a preferred form, a three-wheel foldable stroller including two handles each including a lower end on which a first end of a locking member is slideably mounted. Also pivotably connected to the lower end of each handle is an upper end of one of two front legs. The lower end of each handle is pivotably connected to an upper end of one of two rear legs. A rear wheel is attached to the lower end of each rear leg. A front linking device includes a front-wheel base and two tubes respectively on two sides of the front-wheel base. The front-wheel base includes a lower portion to which a front wheel is attached. Each tube includes an upper end connected to the lower end of one of the front legs and a lower end pivotably connected to an upper portion of the front-wheel base. Second ends of the locking members are respectively engaged with the upper ends of the front legs when the upper ends of the front legs are parallel to the lower ends of the handles, thereby locking the front legs and the handles. The front legs and the tubes are pivotable inward or outward relative to the front-wheel base when the locking members are moved upward and disengaged from the upper ends of the front legs.

In the most preferred form, a first coupler and a second coupler are mounted on the lower end of each handle and spaced from each other. Each locking member is located between the first and second couplers. The upper end of each rear leg is pivotably connected to one of the first couplers. Each second coupler is pivotably connected to one of the front legs at a location below the upper end of the front leg. The foldable stroller further includes a rear linking device having a first coupling plate and a second coupling plate. Each of the first and second coupling plates includes an inner end and an outer end. The inner ends of the first and second coupling plates are pivotably connected together. The outer ends of the first and second coupling plates are respectively and pivotably connected to the rear legs. The front legs and the tubes are located on a plane at an acute angle with a horizontal plane and at an acute angle with a vertical plane when the three-wheel foldable stroller is in an extended state. The front legs and the tubes are pivotable on the plane when the locking members are disengaged from the upper ends of the front legs and when the rear linking device is unlocked.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 3A shows an enlarged view of a circled portion of FIG. 3.

Figure 1:
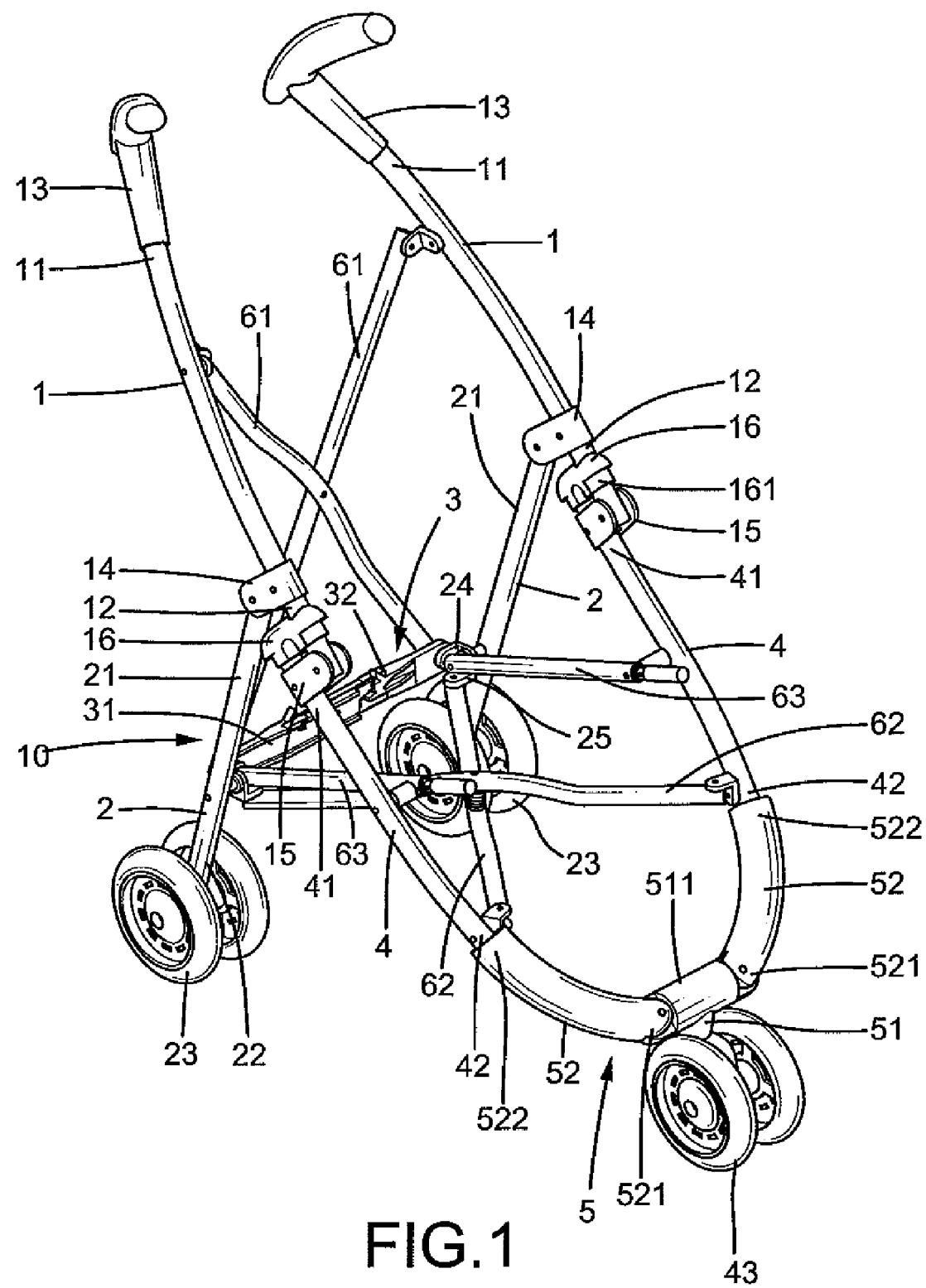
FIG. 1 shows a perspective view of a foldable three-wheel toy stroller according to the preferred teachings of the present invention.
Figure 2:
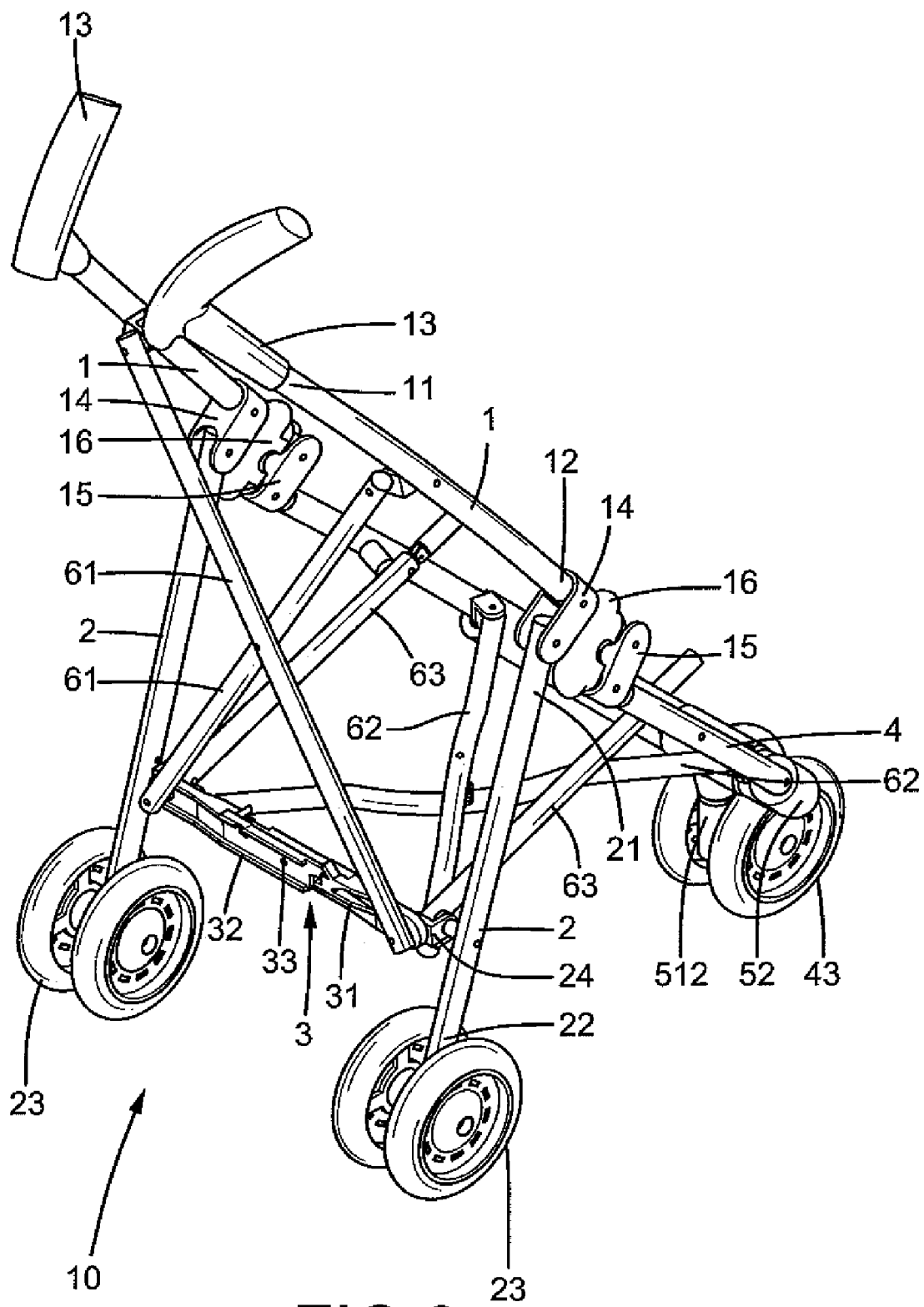
FIG. 2 shows another perspective view of the foldable three-wheel toy stroller of FIG. 1.
Figure 3:
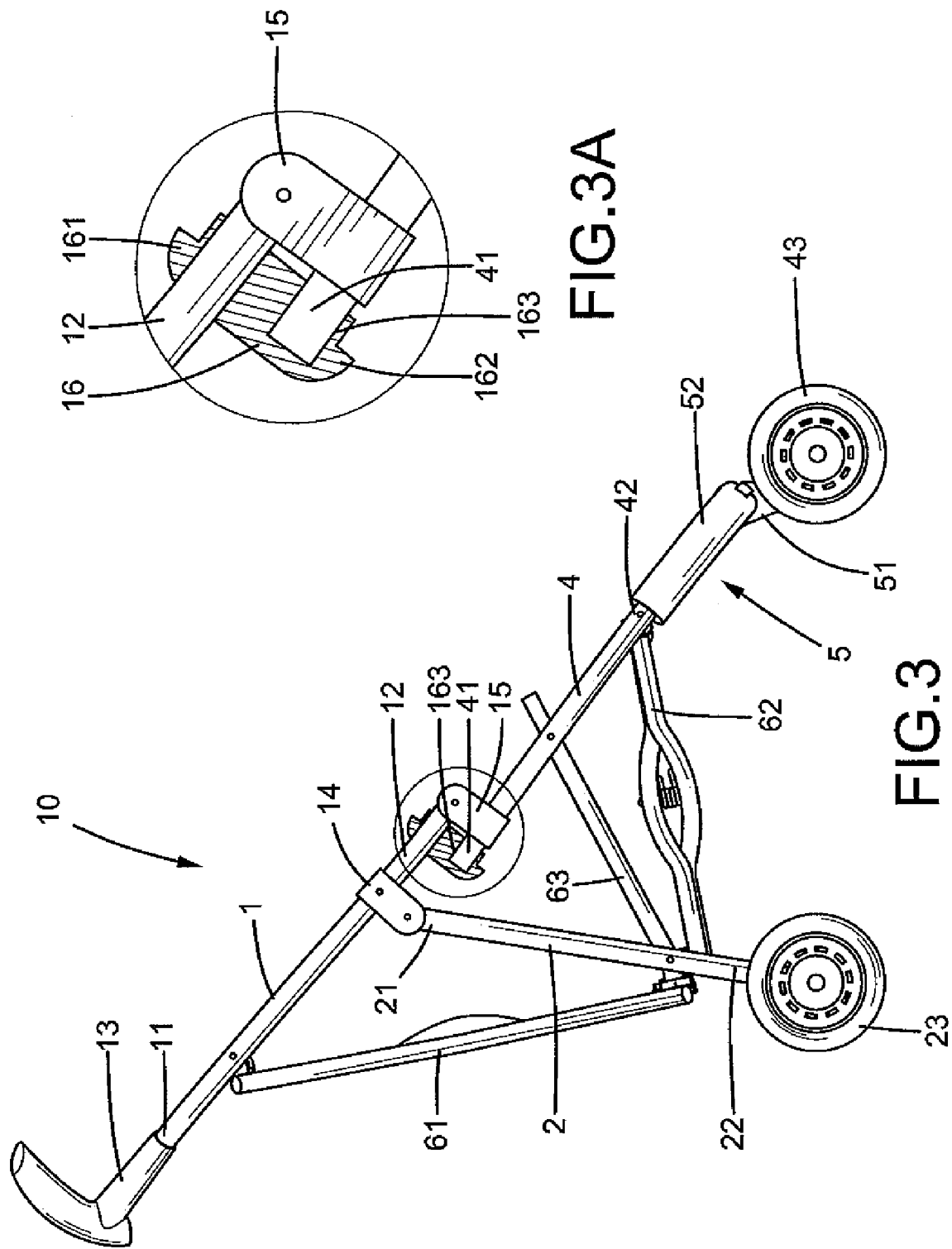
FIG. 3 shows a partially sectioned side view of the foldable three-wheel toy stroller of FIG. 1.
Figure 4:
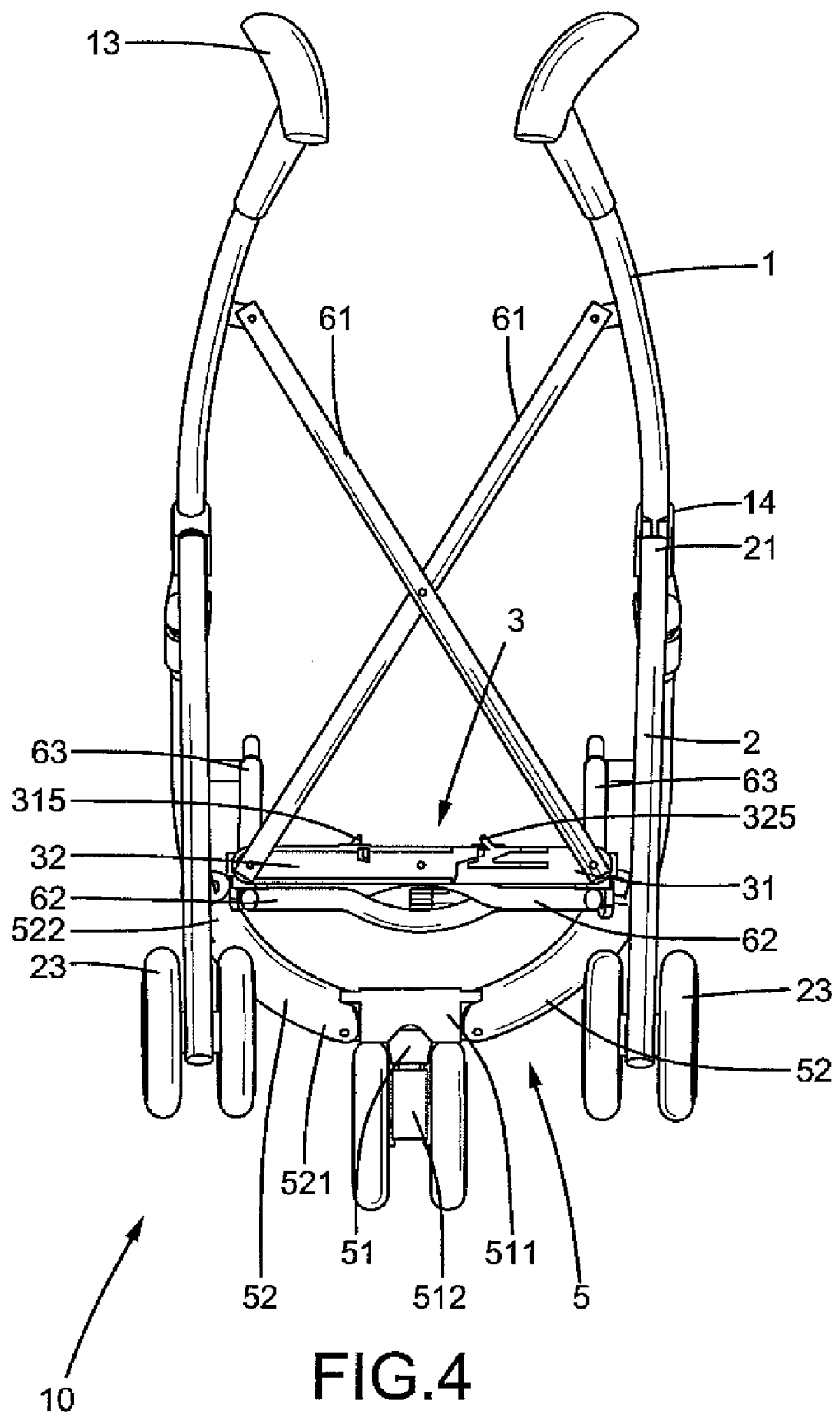
FIG. 4 shows a rear view of the foldable three-wheel toy stroller of FIG. 1.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "lower", "upper", "front", "rear", "end", "portion", "horizontal", "vertical", "inward", "outward""inner", "outer", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A foldable three-wheel stroller according to the preferred teachings of the present invention is shown in the drawings and generally designated 10. The foldable three-wheel stroller 10 can be of any suitable size for carrying a baby or a doll. In the preferred form shown, the foldable three-wheel stroller 10 is a toy stroller.

According to the preferred form, the foldable three-wheel stroller 10 includes a pair of handles 1, a pair of rear legs 2, a rear linking device 3, a pair of front legs 4, and a front linking device 5. Each handle 1 includes an upper end 11 to which a handgrip 13 is fixed. A first coupler 14 is mounted on a lower end 12 of each handle 1. Also mounted on the lower end 12 of each handle 1 below the first coupler 14 is a second coupler 15, with a locking member 16 mounted between the first and second couplers 14 and 15. Each locking member 16 includes a first end 161 slideably mounted on the lower end of one of the handles 1 and a second end 162 having a fixing hole 163.

Each rear leg 2 includes an upper end 21 pivotally connected to one of the first couplers 14, allowing the respective rear legs 2 to pivot relative to the respective handles 1. Each rear leg 2 further includes a lower end 22 to which a rear wheel 23 is coupled. At least one connecting board is mounted to each rear leg 2 above the lower end 22 of the rear leg 2. In the most preferred form shown, there are two connecting boards. Specifically, a first connecting board 24 and a second connecting board 25 are fixed to each rear leg 2 and generally perpendicular to each other. Nevertheless, the first and second connecting boards 24 and 25 may be integrally formed with each other as a single board.

Figure 5:
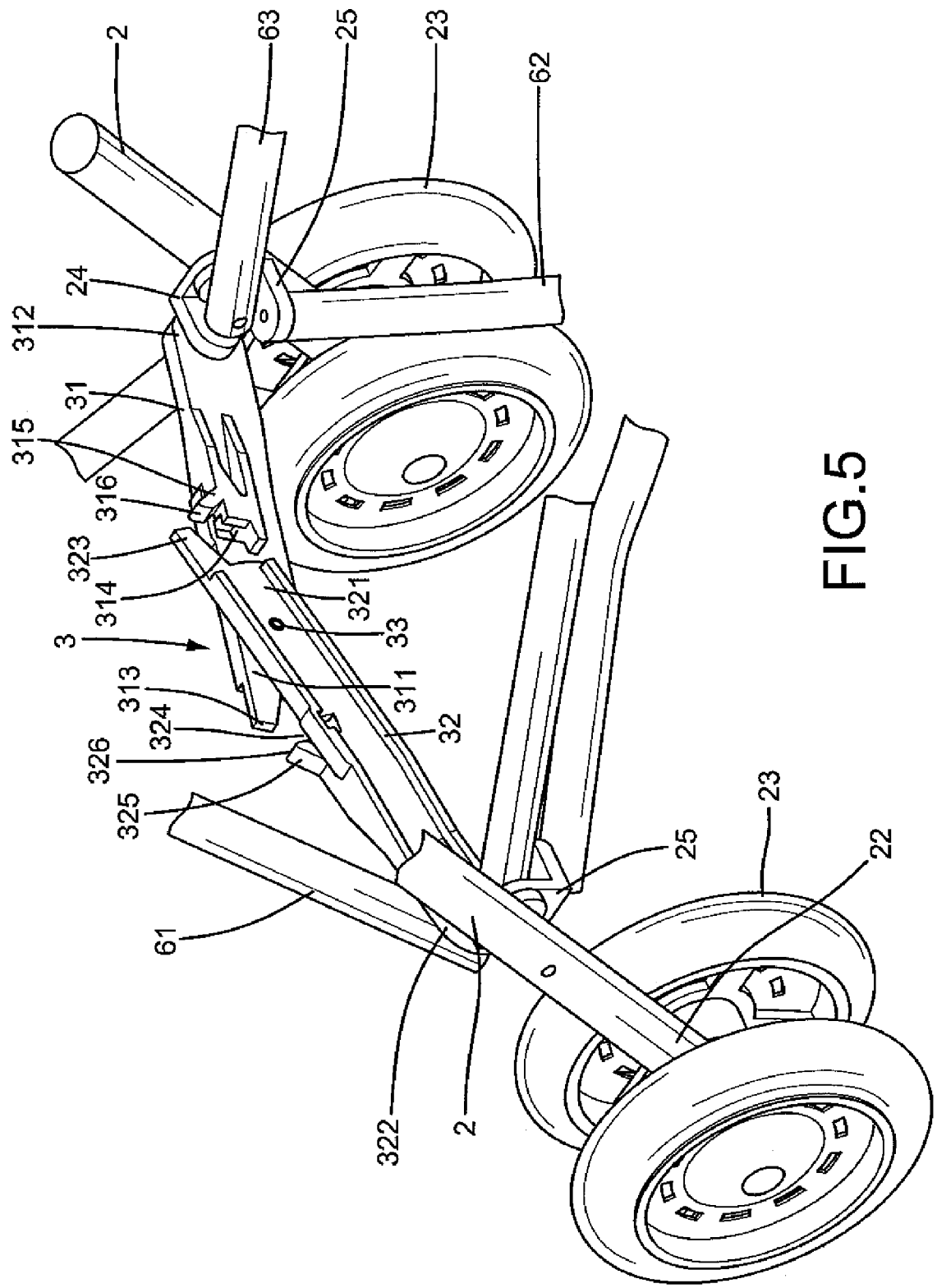
FIG. 5 shows a partial, perspective view of the foldable three-wheel toy stroller of FIG. 1 in an enlarged scale, with first and second coupling plates pivoted upward.

With reference to FIG. 5, the rear linking device 3 includes a first coupling plate 31 and a second coupling plate 32. An inner end 311 of the first coupling plate 31 is pivotally connected by a pin 33 to an inner end 321 of the second coupling plate 32. Outer ends 312 and 322 of the first and second coupling plates 31 and 32 are respectively and pivotally connected to the first connecting boards 24. The inner end 311, 321 of each of the first and second coupling plates 31 and 32 further includes an engaging portion 313, 323 extending outward therefrom. Each of the first and second coupling plates 31 and 32 further includes a groove 314, 324 in an intermediate portion thereof for receiving the engaging portion 313, 323 of the other coupling plate 31 or 32 when the first and second coupling plates 31 and 32 are colinear. A stop 315, 325 is formed above each groove 314, 324 for preventing the engaging portion 313, 323 engaged in the groove 314, 324 from moving upward. Each stop 315, 325 includes a guiding face 316, 326 for guiding the engaging portion 313, 323 into the groove 314, 324.

Each second coupler 15 is pivotally connected to one of the front legs 4 at a location below an upper end 41 of the front leg 4, allowing the respective front legs 4 to pivot relative to the respective handles 1. When the upper ends 41 of the front legs 4 are substantially parallel to the lower ends 12 of the handles 1, the locking members 16 can be slid downward to engage the fixing holes 163 of the second ends 162 of the locking members 16 with the upper ends 41 of the front legs 4. The front legs 4 and the handles 1 are, thus, locked together.

The front linking device 5 is substantially U-shaped and includes a front-wheel base 51 and two substantially arc-shaped tubes 52 respectively on two sides of the front-wheel base 51. Specifically, the front-wheel base 51 includes an upper portion 511 and a lower portion 512 to which a front wheel 43 is attached. Each tube 52 includes an upper end 522 connected to a lower end of one of the front legs 4. Each tube 52 further includes a lower end 521 pivotally connected to an end of the upper portion 511 of the front-wheel base 51. Thus, the front legs 4 and the tubes 52 can pivot inward or outward relative to the front-wheel base 51. Specially, the front legs 4 and the tubes 52 are located on a plane at an acute angle with a horizontal plane parallel to the ground and at an acute angle with a vertical plane when the three-wheel foldable stroller 10 is in the extended state (see FIG. 1). The front legs 4 and the tubes 52 are pivotable on the plane when the locking members 16 are disengaged from the upper ends 41 of the front legs 4 and when the rear linking device 3 is unlocked.

In the most preferred form shown, a first pair of X-hinged beams 61, a second pair of X-hinged beams 62, and a pair of parallel beams 63 are provided for reinforcing the frame of the three-wheel foldable stroller 10. Specifically, an upper end of each beam 61 is pivotably connected to one of the handles 1 at a location adjacent to the upper end 11 of the handle 1, and lower ends of the beams 61 are respectively and pivotably connected to the outer ends 312 and 322 of the first and second coupling plates 31 and 32. A front end of each beam 62 is pivotably connected to one of the front legs 4 at a location adjacent to the lower end 42 of the front leg 4. A rear end of each beam 62 is pivotably connected to one of the second connecting boards 25. A rear end of each beam 63 is pivotably connected to one of the first connecting board 24. A front end of each beam 63 is pivotably connected to an intermediate portion of one of the front legs 4. A seat (not shown) may be mounted to the frame of the three-wheel foldable stroller 10 and supported by the beams 63.

When the three-wheel foldable stroller 10 according to the preferred teachings of the present invention is in its extended state, the respective handles 1 and the respective front legs 4 are fixed together by the locking members 16 that serves as a first security device. Meanwhile, the respective rear legs 2 are locked by the rear linking device 3 that serves as a second security device. When a child is playing with the three-wheel foldable stroller 10 according to the preferred teachings of the present invention, the movable joints of the frame will not fold due to impact or other causes to assure safety.

Figure 6:
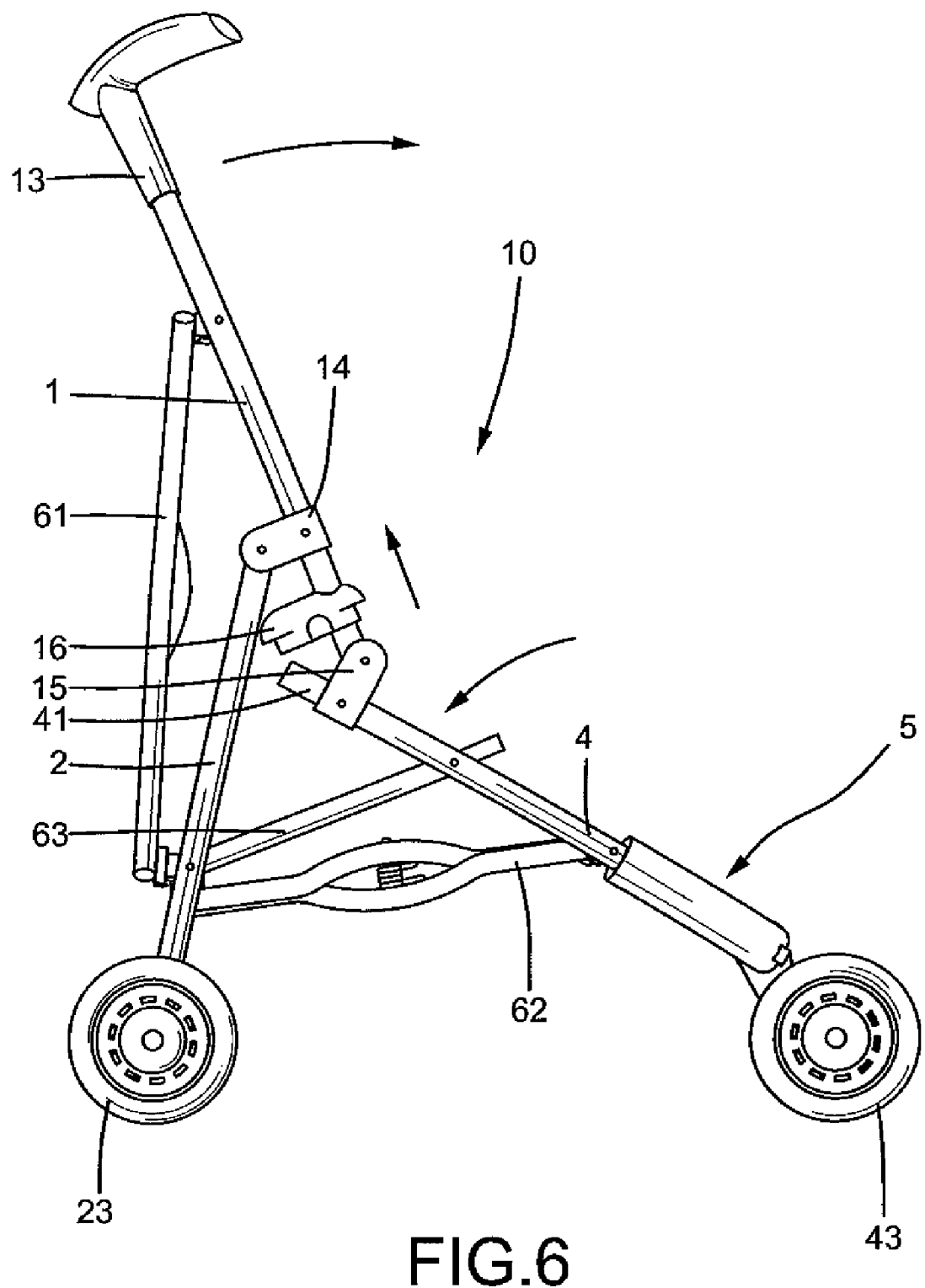
FIG. 6 shows a side view of the foldable three-wheel toy stroller of FIG. 1 with two locking members pivoted upward to unlock two handles and two front legs.
Figure 7:
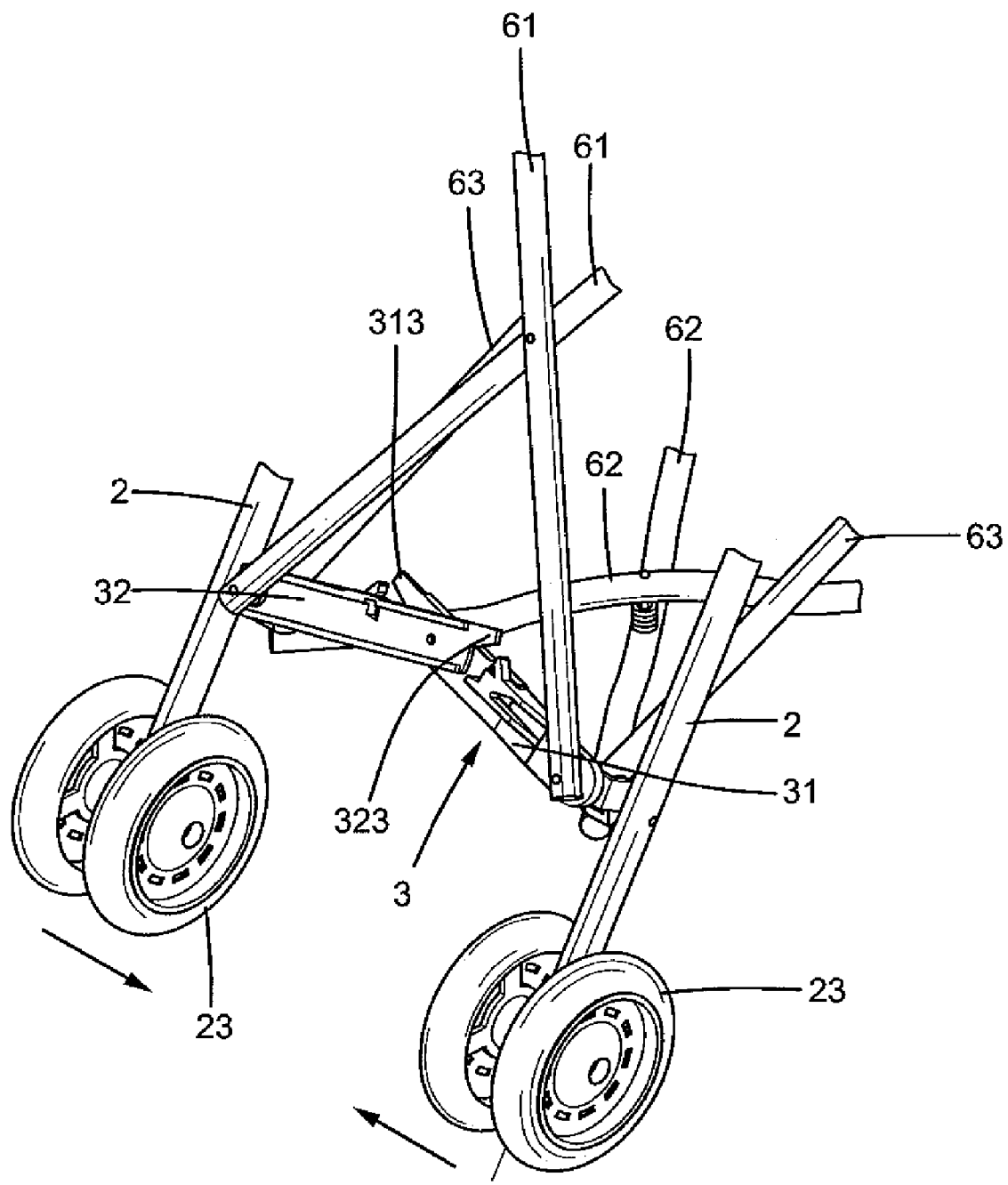
FIG. 7 shows a partial, perspective view of the foldable three-wheel toy stroller of FIG. 1 with engaging portions of two coupling plates disengaged from grooves to allow inward folding of two rear legs.
Figure 8:
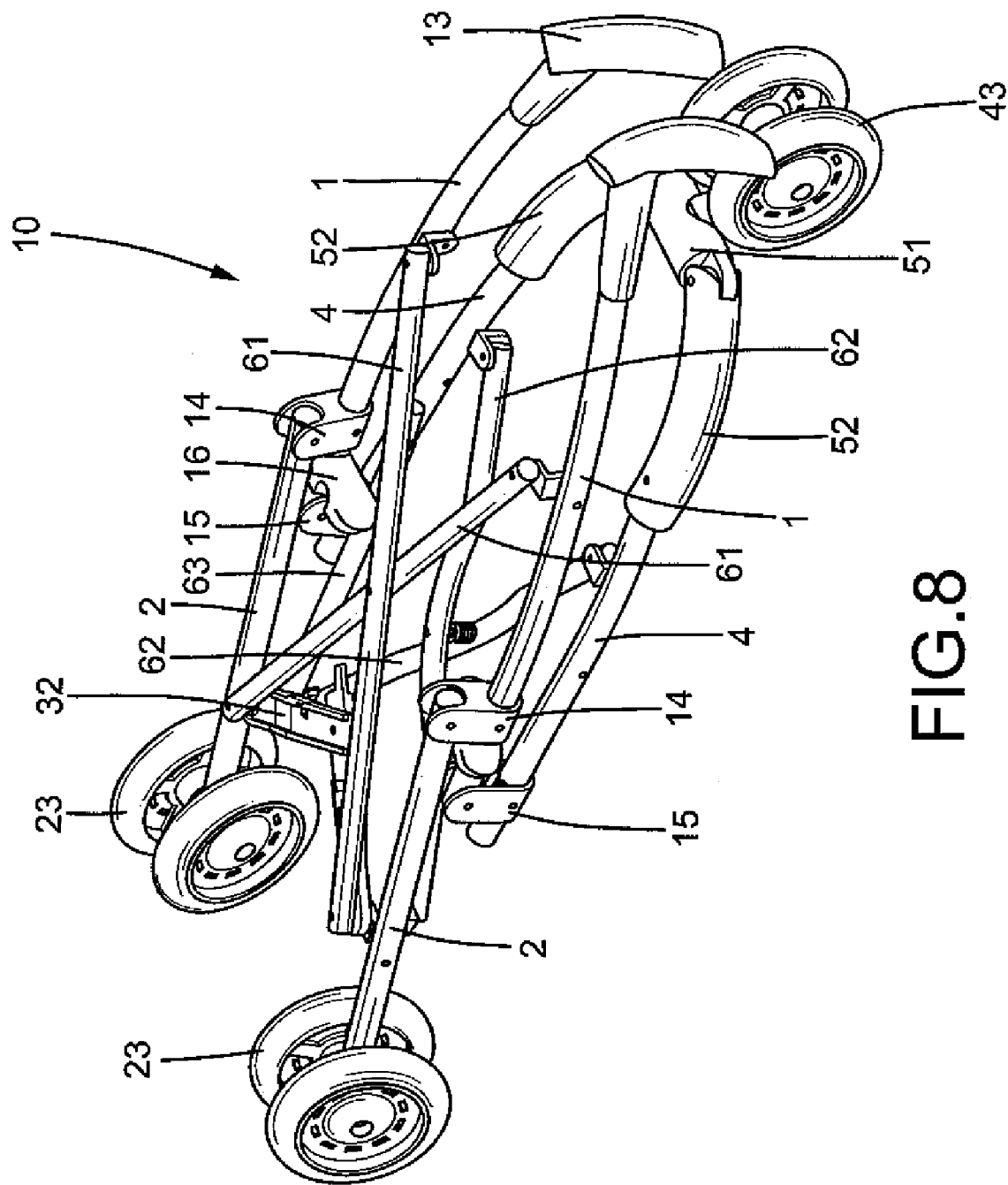
FIG. 8 shows a perspective view of the foldable three-wheel toy stroller of FIG. 1 in a completely folded state.
Figure 9:
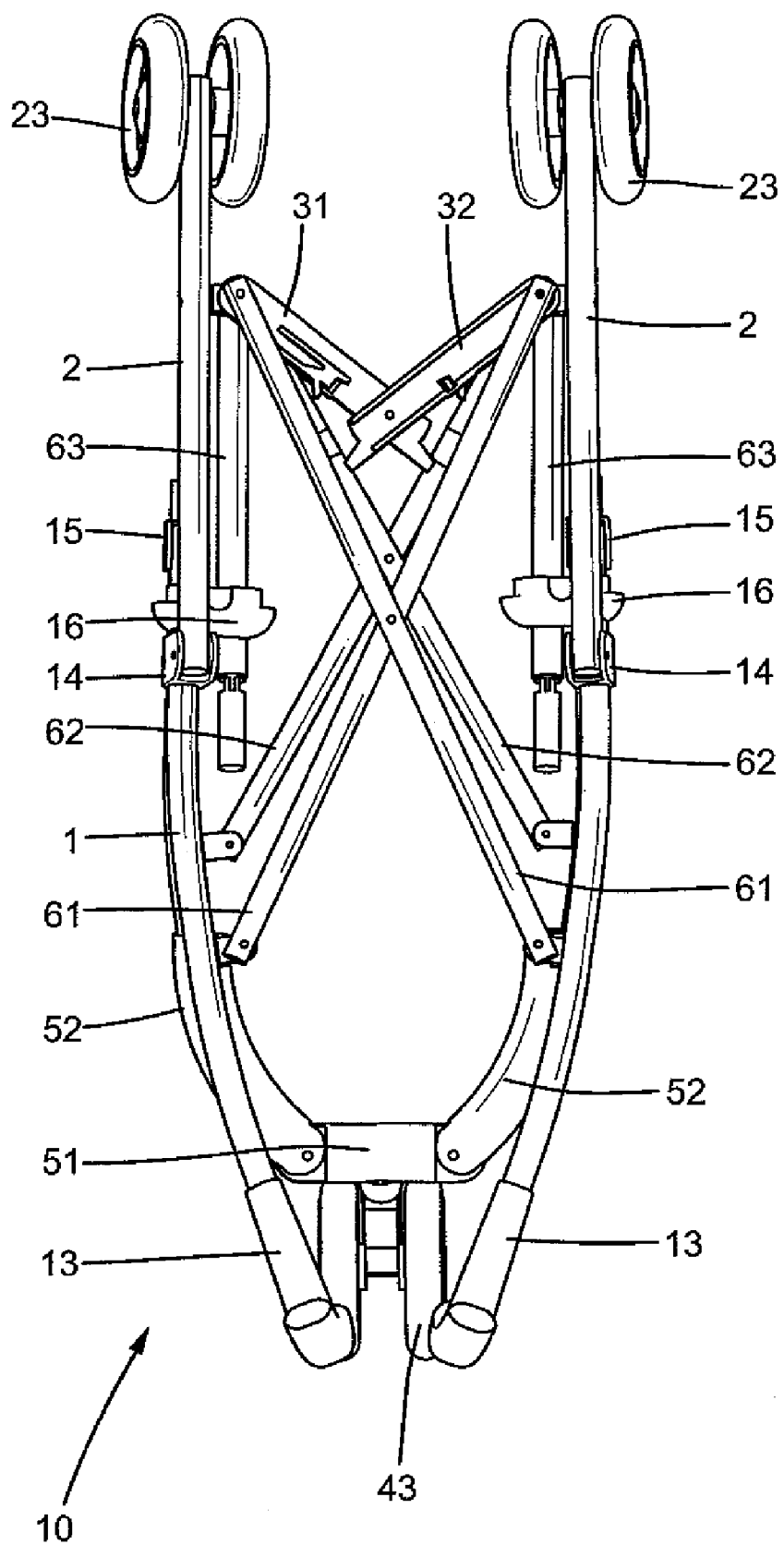
FIG. 9 shows a top view of the foldable three-wheel toy stroller of FIG. 8.

When folding of the three-wheel foldable stroller 10 according to the preferred teachings of the present invention is required, the locking members 16 serving as the first security device are moved upward to unlock the front legs 4 and the handles 1. The front legs 4 and the handles 1 can pivot relative to each other after the rear linking device 3 is unlocked, with the second couplers 15 serving as movable joints, as shown in FIG. 6. With reference to FIG. 7, the rear linking device 3 serving as the second security device can be unlocked before, after, or at the same time the locking members 16 are unlocked. Specifically, an upward force is applied to the pivotal connection between the first and second coupling plates 31 and 32 to disengage the engaging portions 313 and 323 from the grooves 314 and 324, allowing the rear legs 2 and the beams 61, 62, and 63 to pivot inward to a completely folded state shown in FIGS. 8 and 9. It is noted that the front legs 4 also pivot inward in which the tubes 52 serve as movable joints. The width of the three-wheel foldable stroller 10 according to the preferred teachings of the present invention is further reduced after folding, allowing easy storage and transport.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A three-wheel foldable stroller comprising:
   two handles each including an upper end and a lower end, with a locking member being mounted on the lower end of each said handle, with each said locking member including a first end slideably mounted on the lower end of one of the two handles and a second end;

two rear legs each including an upper end pivotably connected to the lower end of one of the two handles and a lower end, with a rear wheel being attached to the lower end of each said rear leg;

two front legs each including an upper end pivotably connected to the lower end of one of the two handles and a lower end; and a front linking device including a front-wheel base and two tubes respectively on two sides of the front-wheel base, with the front-wheel base including an upper portion and a lower portion, with a front wheel being attached to the lower portion of the front-wheel base, with each said tube including an upper end connected to the lower end of one of the two front legs and a lower end pivotably connected to the upper portion of the front-wheel base, with the second ends of the locking members being respectively engaged with the upper ends of the two front legs when the upper ends of the two front legs are parallel to the lower ends of the two handles thereby locking the two front legs and the two handles, and with the two front legs and the two tubes being pivotable inward or outward relative to the front-wheel base when the locking members are moved upward and disengaged from the upper ends of the two front legs.

2. The three-wheel foldable stroller as claimed in claim 1, further comprising a first coupler and a second coupler mounted on the lower end of each said handle and spaced from each other, with each of the locking members being located between the first and second couplers, with the upper end of each said rear leg being pivotably connected to one of the first couplers, and with each said second coupler being pivotably connected to one of the two front legs at a location below the upper end of the front leg.

3. The three-wheel foldable stroller as claimed in claim 1, further comprising a rear linking device including a first coupling plate and a second coupling plate, with each of the first and second coupling plates including an inner end and an outer end, with the inner ends of the first and second coupling plates being pivotably connected together, with the outer ends of the first and second coupling plates being respectively and pivotably connected to the two rear legs.

4. The three-wheel foldable stroller as claimed in claim 3, with the inner end of each of the first and second coupling plates including an engaging portion extending outward, with each of the first and second coupling plates further including a groove in an intermediate portion thereof for receiving the engaging portion of another of the first and second coupling plates when the first and second coupling plates are colinear, with each of the first and second coupling plates further including a stop formed above each said groove for preventing the engaging portion engaged in the groove from moving upward.

5. The three-wheel foldable stroller as claimed in claim 3, further comprising a pair of X-hinged beams each including a first end pivotably connected to one of the two handles at a location adjacent to the upper end of the handle and a second end, and with the second ends of the pair of X-hinged beams being respectively and pivotably connected to the outer ends of the first and second coupling plates.

6. The three-wheel foldable stroller as claimed in claim 3, further comprising a pair of X-hinged beams each including a first end pivotably connected to one of the two front legs at a location adjacent to the lower end of the front leg and a second end pivotably connected to one of the two rear legs.

7. The three-wheel foldable stroller as claimed in claim 3, further comprising a pair of parallel beams each including a first end pivotably connected to one of the two rear legs and a second end pivotably connected to an intermediate portion of one of the two front legs.

8. The three-wheel foldable stroller as claimed in claim 3, with the two front legs and the two tubes being located on a plane at an acute angle with a horizontal plane and at an acute angle with a vertical plane when the three-wheel foldable stroller is in an extended state, and with the two front legs and the two tubes being pivotable on the plane when the locking members are disengaged from the upper ends of the two front legs and when the rear linking device is unlocked.

* * * * *